United States Patent [19]

Yamada

[11] Patent Number: 4,502,825
[45] Date of Patent: Mar. 5, 1985

[54] MULTI-HEADED SCREW

[75] Inventor: Yukihiko Yamada, Yamato, Japan

[73] Assignee: Kyodo Electric Co., Ltd., Tokyo, Japan

[21] Appl. No.: 344,649

[22] Filed: Feb. 1, 1982

[30] Foreign Application Priority Data

Mar. 30, 1981 [JP] Japan .............................. 56-45015[U]

[51] Int. Cl.³ .............................................. F16B 31/00
[52] U.S. Cl. ........................................ 411/5; 411/402; 411/910
[58] Field of Search ........................................ 411/1–7, 411/402, 403, 410, 910, 378, 427, 911, 901, 902; 81/121 R, 90 C, 436–438; 339/22 B, 37, 39

[56] References Cited

U.S. PATENT DOCUMENTS

| 1,688,400 | 10/1928 | Simpson ............................. 81/121 R |
| 2,316,695 | 4/1943 | Jaffa .................................. 411/910 X |
| 3,383,458 | 5/1968 | Raskhodoff et al. ............. 339/22 B |
| 3,444,775 | 5/1969 | Hills .................................... 411/5 |
| 3,561,317 | 2/1971 | Rowell ................................ 411/5 |
| 3,635,106 | 1/1972 | Homs ................................. 81/121 R |
| 3,742,583 | 7/1973 | Devlin et al. ...................... 411/2 X |
| 3,779,105 | 12/1973 | Triplett et al. .................... 81/121 R |
| 3,812,757 | 5/1974 | Reiland ............................... 411/5 |
| 4,029,379 | 6/1977 | Kotala et al. ...................... 339/22 B |
| 4,242,932 | 1/1981 | Barmore . |
| 3,909,098 | 9/1975 | Reed et al. ......................... 339/22 B |

FOREIGN PATENT DOCUMENTS

| 2625142 | 12/1977 | Fed. Rep. of Germany .......... 411/3 |
| 113751 | 9/1979 | Japan ................................. 411/2 |
| 2067699 | 7/1981 | United Kingdom .................... 411/5 |

Primary Examiner—Gary L. Smith
Assistant Examiner—Thomas J. Dubnicka
Attorney, Agent, or Firm—Polster, Polster and Lucchesi

[57] ABSTRACT

A screw member having a plurality of heads by providing one or more thin neck portions between them to be sheared at a predetermined torque, wherein a cap member surrounding the outer periphery of an inner head part from the side of its bearing surface is engaged with the inner head part so as not to displace outwardly slipping out of it, and the inner peripheral surface of the cap member is made conformable to a shape of the outer peripheral surface of a socket of a screw driving tool to be fitted on the inner head part.

9 Claims, 9 Drawing Figures

MULTI-HEADED SCREW

BACKGROUND OF THE INVENTION

(a) Field of the Invention

This invention relates to a screw member such as a bolt or a nut, for use in joining together various component parts in electric appliances. More particularly, it is concerned with a multi-headed screw member having a thin neck portion (or portions) to be sheared with a predetermined tightening torque.

Whether the screw is tightened with a predetermined torque or not, is verified in general by use of a torque wrench. However, if a number of the screws are used, it is often very difficult to check and verify the tightening torque of each and every bolt or nut. Moreover, failure occurs sometimes in such verification.

Also, when electrically conductive members in an electric appliance are to be joined together by the screws, if the tightening force is insufficient, the conductors generate heat due to insufficient contact between pairs of them so as to be liable to cause unexpected troubles and disorders. On the other hand, if the tightening force is excessive, there is a possibility of the screws and connected parts of the conductors being damaged.

(b) Description of Prior Art

In view of the problems described above, various sorts of screw members have been proposed, capable of exerting a predetermined tightening force without use of the torque wrench.

Such screw members have head parts divided into an inner head part and an outer head part by a thin neck portion to be sheared at a predetermined tightening torque. The thin neck portion is defined at approximately the middle portion of the screw member head where a screw member driving tool such as wrench, spanner, etc. is applied, (e.g., to the head 1C of a bolt 1 as shown in FIG. 1 of the accompanying drawing).

The double-headed bolt 1 shown in FIG. 1 is tightened by applying a tool on the outer head part 1C. When the tightening torque reaches a predetermined value, the thin neck portion 2 breaks (shears), and the tightening operation is complete. Further tightening or loosening of the already tightened bolt can be done by applying the screw driving tool to the inner head part 1A which remains after the outer head part 1C is twisted off, and turning it.

As stated in the foregoing, the bolt 1 should always be turned by applying the screw driving tool on and around the outer head part 1C. However, in case many bolts 1 are being assembled, or the work is done in a hurry, it sometimes happens that the tightening tool is mistakenly applied to the inner head part 1A and turned. In such case, since the thin neck portion 2 is not sheared, no determination can be made as to whether or not a predetermined tightening torque has been attained and it may happen that the screw is subjected to excessive tightening.

In other occasions, after the screw driving tool is applied to the outer head part 1C and the thin neck portion 2 is accurately sheared at a predetermined tightening torque, when an ordinary screw driving tool having no torque control function is applied on the remaining inner head part 1A to loosen the bolt 1 and re-tighten the same for re-assembling the electric appliance, etc. due to erroneous assembly, the fact that the bolt has been re-tightened cannot be recognized visually, with the result that the effect of controlling the tightening torque, which the bolt of this sort aims at, is negated.

Also, as in the case of a bolt 1 shown in FIG. 2, some of these bolts have triple heads, i.e., an inner head part 1A, a middle head part 1B, and an outer head part 1C divided by a large diameter neck portion 2A and a small diameter neck portion 2B, the two necks being sheared with differing tightening torque.

These triple-headed bolts, or nuts, as the case may be, are tightened by applying a screw driving tool to the outer head part 1C thereof, and then turning the tool. When the tightening torque reaches a first predetermined value, the small diameter neck portion 2B is sheared. Subsequently, the screw driving tool is applied to the middle head part 1B thereof, and then the tool is turned. When the tightening torque reaches a second predetermined value, the large diameter neck portion 2A is sheared, whereby the tightening work is completed. With this type of screw member, there can be performed two-stage tightening, i.e., so-called provisional tightening and final tightening.

Even in this case, there is the same possible mistreatment following initial installation as is the case with the double-headed bolt. In the case of the nut, either double or triple-headed, there is also the possibility that the nut will be inverted accidentally, negating the twist-off function entirely.

SUMMARY OF THE INVENTION

In view of the problems discussed above, it is an object of the present invention to provide a screw member (bolt or nut) of the type having multiple heads, with one or more thin neck portions between them to be sheared at a predetermined tightening torque, in which visible evidence of the fact of loosening and tightening after the screw is initially tightened is provided, and the handling of the screw member at the inspection and maintenance of the device as assembled is facilitated.

According to the present invention, generally stated, a screw member is provided with a plurality of heads disposed in a longitudinal direction of the screw member, each of the plurality of heads being interconnected with its adjacent one by a neck portion, the neck portion being so thin as to be sheared when a tightening torque is applied thereto which exceeds a predetermined value. A cap member surrounds at least the innermost one of the heads and is spaced from it a distance sufficient to receive a socket wrench. The inner wall of the cap member is made non-circular, in the preferred embodiment by axially extending ribs, to preclude the use of a standard socket wrench with a smoothe cylindrical outer surface.

There has thus been outlined, rather broadly, the more important feature of the present invention in order that the detailed description thereof that follows may be better understood, and in order that the present contribution to the art may be better understood and appreciated. There are, of course, additional features of the invention that will be described hereinafter and which will form the subject of the claims appended hereto. Those skilled in the art will appreciate that the conception upon which this disclosure is based may readily be utilized as a basis for the designing of other structure for carrying out the several purposes of the present invention. It is important, therefore, that the claims be regarded as including such equivalent construction so far as they do not depart from the spirit and scope of the present invention.

BRIEF DESCRIPTION OF THE ACCOMPANYING DRAWING

Specific embodiments of the present invention have been chosen for the purpose of illustration and description, and are shown in the accompanying drawing, forming a part of the specification, in which.

DETAILED DESCRIPTION OF PREFERRED EMBODIMENT

Figure 1:
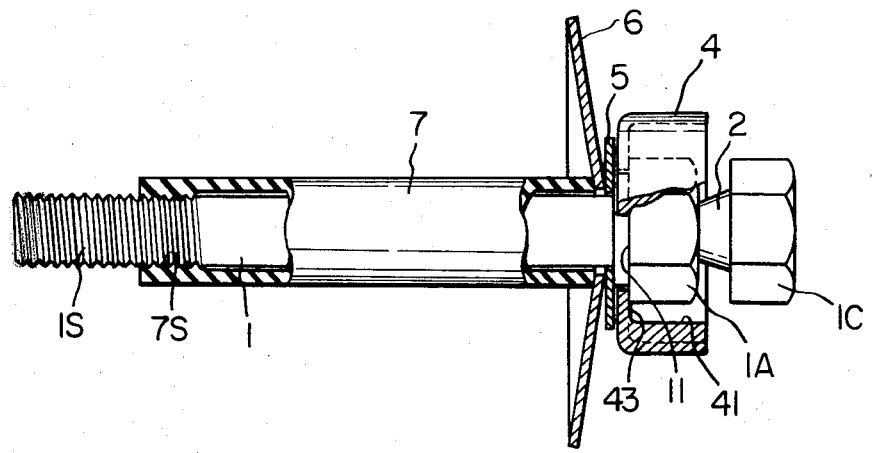
FIG. 1 is a view in side elevation, partly in longitudinal cross-section, of a double-headed, insulatively coated bolt, to which the present invention is applied.
Figure 9:
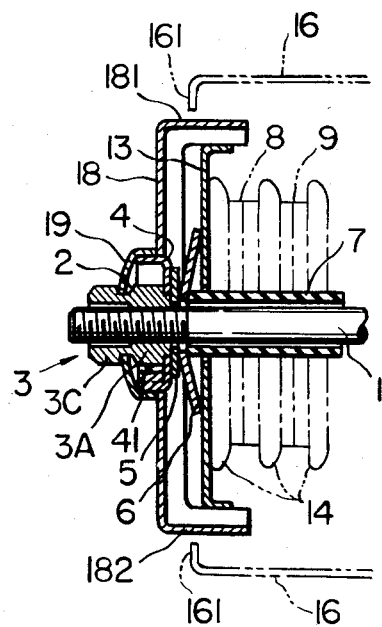
FIG. 9 is a longitudinal cross-sectional view of a main part of the bus duct connection where a double-headed nut is used, which is in a provisionally tightened state.

Referring now to the drawings, and particularly to FIG. 1 for one illustrative embodiment of the invention, a bolt 1 has two heads, an inner head 1A and an outer head 1C, with a neck 2 between them. In the embodiment shown in FIG. 9, the screw member is a nut 3, with an inner head 3A and an outer head 3C, and a neck 2 between them. In the embodiment shown in FIG. 2, the screw member is a bolt, provided with three heads, an inner head 1A, an intermediate head 1B and an outer head 1C with a neck 2A between heads 1A and 1B and neck 2B between heads 1B and 1C. In each of these embodiments, the inner head 1A has a step in its lower edge, to provide an integral riser 21 and a radial undersurface 11, to provide relief for a cap flange as will be explained. In the embodiment shown in FIG. 4, the relief is provided by notches 12, into which projections on the cap flange extend. In all of the embodiments shown, the heads of the screw member are hexagonal in plan, with six flat faces. This is conventional, but can be varied.

In each of the embodiments, a cap member 4 is provided, with a side wall defining an open mouth at one end, the side wall having an inner surface surrounding but spaced radially outwardly from the inner head 1A or 3A as the case may be, and an inwardly extending annular flange 43. The inner wall surface is, in plan, non-circular. In the embodiments shown, the non-circularity is in the form of protruberances or ribs 41 extending axially from the open mouth of the cap to the flange.

Figure 3:
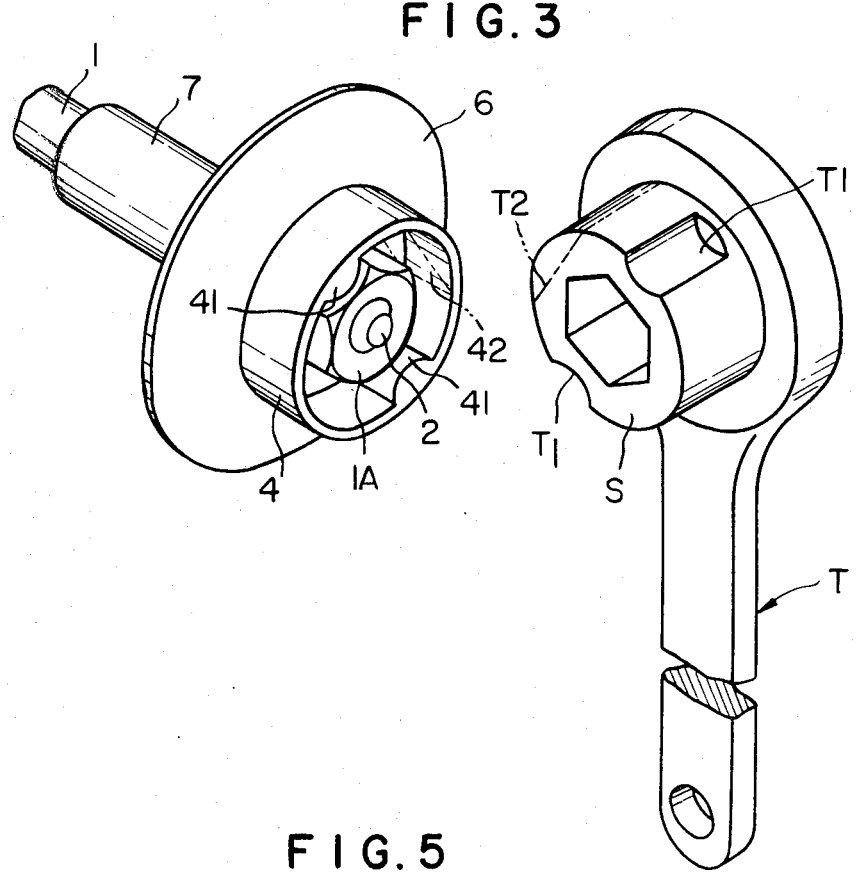
FIG. 3 is a view in perspective of the head part or the bolt shown in FIG. 1 after the outer head has been sheared from it, and of a screw driving tool adapted to fit the inner head part within a cap surrounding the inner head.

Referring to FIG. 3, a screw driving tool T, in this embodiment a one-way ratcheting socket wrench with a handle and a socket S, has grooves $T_1$ extending axially from the open end of the socket, in the outer surface of the socket, which is otherwise cylindrical. The grooves $T_1$ are shaped and sized complementarily to the ribs 41, to permit the socket to be inserted between the cap and the head 1A or 3A to engage the head.

Figure 4:
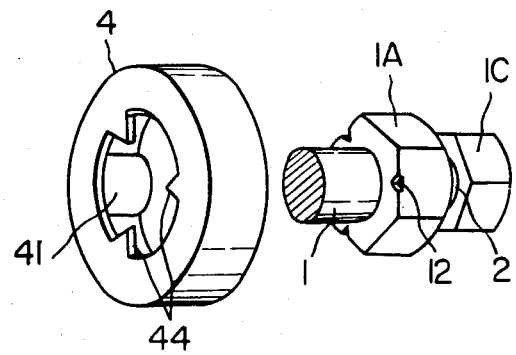
FIG. 4 is a view in perspective, partly broken away, of another embodiment of cap member and bolt head of this invention.

In the embodiment shown in FIG. 4, the lower head 1A is provided with notches 12 at the lower edge of three faces of the hexagonal head, and the cap flange is provided with triangular projections 44, the apices of which extend into the notches. The notches serve to prevent rotation of the cap member 4, and to position the cap member 4 and the screw driving tool T. Such a cap and notch arrangement can be used in connection with a nut as well as a bolt.

In both the embodiment with the stepped lower surface and the embodiment with the notches, the height of the riser or the axial depth of the notches is greater than the thickness of the flange, so that there is clearance enough when the flange is in place to permit the undersurface of the inner head radially inboard of the notches or step to engage a washer 5 directly.

Figure 2:
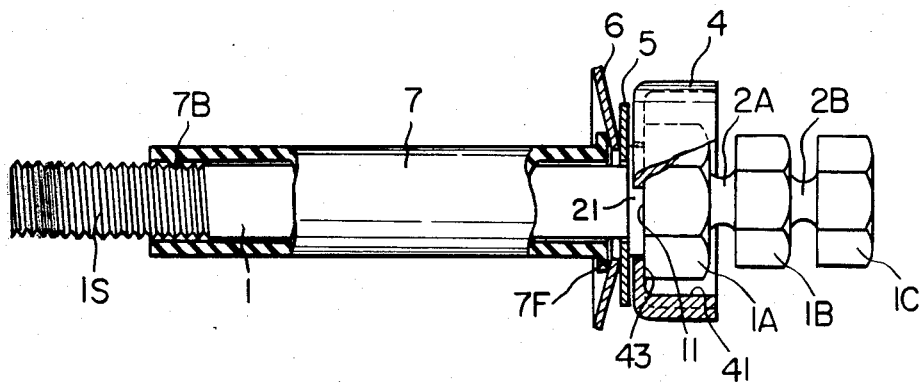
FIG. 2 is a view in side elevation, partly in longitudinal cross-section, of a triple-headed bolt, to which the concept of the present invention is applied.

In the embodiments shown, the washer 5 bears on a spring washer 6, which in turn bears on the upper end of an insulator sleeve or sheath 7, mounted on the bolt 1. The sheath 7 may be provided with an outturned flange 7F to accomodate spring washers with larger holes in them, as shown in FIG. 2. It may be secured to the bolt shank in any suitable way, as by elastic or frictional fit, adhesive, heat shrinking, and the like. In the embodiment shown in FIG. 1, the sheath is provided with an interior boss at its outer end, internally threaded at 75 to be threaded onto an externally threaded part 1S of the bolt 1. In the embodiment shown in FIG. 2, projections 7B extending inwardly at the outer end of the sheath, engage the threaded part 1S.

When the socket wrench T is a single-direction ratchet type torque wrench, the tool functions only in the tightening direction of the screw member, so that only tightening, with a predetermined torque, can be accomplished.

It can be seen that once the outer head or heads are sheared off, the screw member can only be driven or loosened with a special socket wrench that will fit between the cap wall and the inner head, unless the cap is removed.

The cap, washer 5, spring washer 6 and sheath 7 are assembled in that order. The sheath 7, being mounted tightly, holds all of the parts in place, so that the parts cannot be lost, and the entire assembly can be inserted with the bolt and sheath extending through a bolt hole easily and quickly.

In order to loosen the screw member, it is necessary to break or rupture the cap. Accordingly, it is apparent at a glance that a screw member has been loosened for some reason, because it will have no cap around it.

Figure 5:
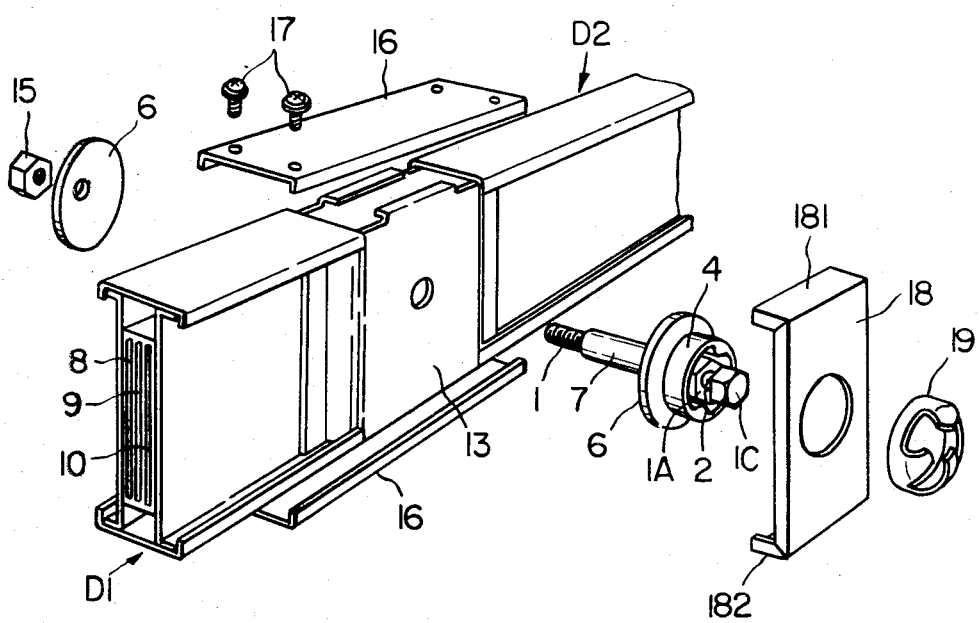
FIG. 5 is an exploded view of a bus duct connection, in which a screw member of this invention is used.
Figure 6:
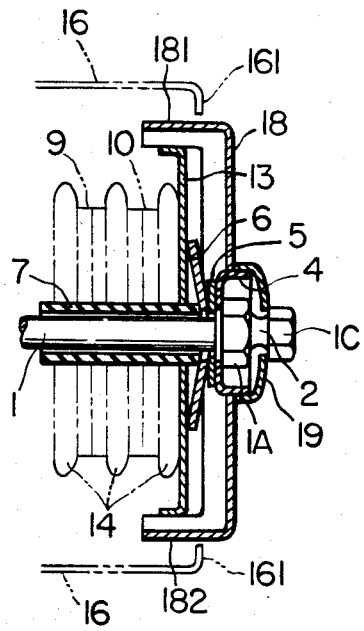
FIG. 6 is a longitudinal cross-sectional view of a main part of the bus duct connection which is "provisionally" tightened.
Figure 7:
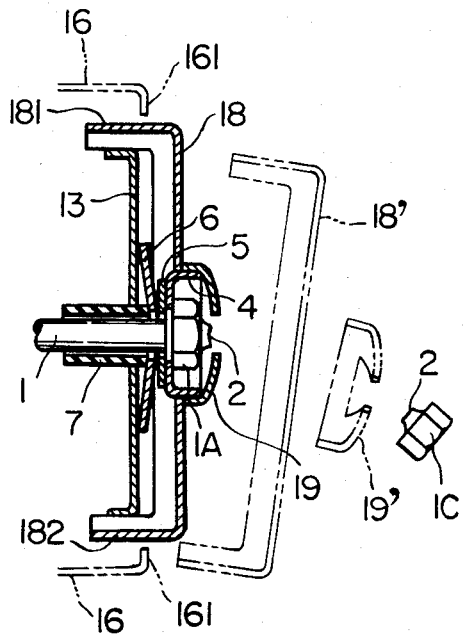
FIG. 7 is a longitudinal cross-sectional view of a main part of the bus duct connection which is "finally" tightened.
Figure 8:
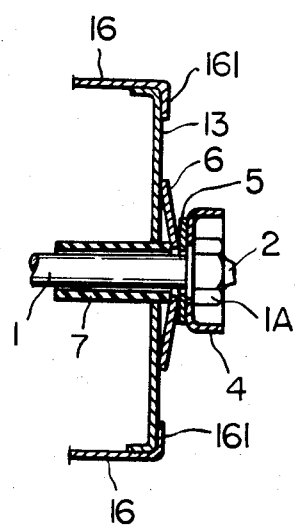
FIG. 8 is a longitudinal cross-sectional view of the main part of the bus duct connection with a top connecting cover being fitted after the final tightening.

Referring to FIG. 5, a screw member of this invention is shown as being used to connect two bus duct units $D_1$ and $D_2$. Each of the bus duct units has a top plate, a bottom plate and spaced side plates extending between them, enclosing insulated conductor members 8, 9 and 10, separated by insulators 14. The units are joined by connecting plates 13 and top and bottom covers 16. The connecting plates 13 are joined by a bolt 1 with heads 1A and 1C, and a cap 4, washer 5 and spring washer 6 mounted as has been described. A preventive member 18 which has an upper inboardly extending lip 181 and a lower lip 182, to ensure that the top and bottom covers 16 are not installed before the bolt is tightened, is mounted on the head of the bolt by means of a stopper or clip-cap 19. The clip-cap has inwardly tending elastic fingers that snap into the groove defined by the heads and neck 2 as shown in FIG. 6, to hold the preventive member 18. The assembled bolt, with the members 18 and 19 on it, is passed through bolt holes in the conductors and insulators, and a spring washer and nut 15 are mounted on the threaded end of the bolt 1. The bolt can be turned by an ordinary box, open end or socket wrench, engaging the outer head 1C. As soon as the predetermined tightening torque is reached, the thin neck 2 will shear and the outer head part 1C will fall off, as indicated in FIG. 7. As indicated in that figure, the clip-cap 19 will also be released, and the preventive member 18 with it. The covers 16 can now be accurately fitted and held by means of screws 17. As has been explained, any authorized tightening or testing of the bolt thereafter must be done with a special socket wrench, and if other tightening or loosening is to be done, the cap must be destroyed.

Other means for preventing the use of an ordinary socket wrench on the inner head may be employed. Merely by way of example, and not of limitation, a wedge-shaped boss can be provided in the cap, and a complementary chamfer on the socket, as shown in dotted lines indicated by the reference numerals 42 and $T_2$, respectively in FIG. 3. The inside of the cap and the outside of the socket can be made oval or polygonal. These are merely illustrative.

FIG. 4 shows a modified embodiment, wherein the present invention is applied to the triple-headed bolt. In this embodiment, the skirt 42 of the collar 4 covers only the middle head part 1B, and the cylindrical cap member 5 covers only the inner head part 2A. A separate and auxiliary cap member 5' surrounding the outer periphery of the cap member 5 is formed in a length to fit inside the skirt 42 of the collar 4.

As shown in FIG. 1, the bolt 1, on which the collar 4, the cap member 5, that flat washer 6, the spring washer 7, and the insulative sheath 8 are set beforehand, is inserted into a bolt hole of an object to be assembled, then a spring washer 9 and a nut 10 are fitted on the screw thread 15, and held against rotation as by pressing with fingers, and the screw driving tool is applied on the outer head part 2C of the bolt 1, and turned for tightening the same. When a pedetermined tightening torque is reached, the thin neck portion 3 is sheared, whereby the tightening operation is completed. Upon completion of the tightening, the collar 4 is removed from the inner head part 2A. The nut 10 has its outer periphery formed in a circular shape so that no socket, box or open end wrench or the like can be applied thereon. Also, a square shaft 12 and a square hole 13 for preventing rotation are provided between the nut 10 and the spring washer 9.

Thereafter, when it becomes necessary to loosen or tighten the bolt 1 for maintenance and inspection, the cap member 5 surrounding the outer periphery of the inner head part 2A is cut with a knife, etc., or a screw driver, etc. is inserted into a slit 56 formed in the flange 52 of the cap member 5 to break and remove the cap member, after which the tightening work is effected.

As the consequence of this, those bolts 1 having no cap member 5 fitted on the head part, or having the cap member 5 fitted in the reversed direction indicate the fact that loosening or tightening work was done for some reason or other on the inner head part 2A of the bolt 1 by applying a screw driving tool thereon. This provides a substantially fool-proof measure in that, at the time of checking for the work to be done later, those bolts as mentioned above are replaced with fresh spare bolts with the collar 4 and other members being set thereon, thereby controlling a constant tightening torque of the bolt 1.

In the case of the triple-headed nut 2 shown in FIG. 3, the tool is applied for tightening on the outer head part 2C as is the case with the bolt in FIG. 1. As soon as the predetermined tightening torque is reached, and the small diameter neck portion 3B is sheared, the collar 4 is removed.

Subsequently, at the time of further tightening of the nut, the screw driving tool is applied on the middle head part 2B, and the tightening is continued until the large diameter neck portion 3A is sheared. In this instance, since the outer periphery of the inner head part 2A is covered with the cap member 5, there is no possibility of the tool being applied on the inner head part 2A by mistake.

Thereafter, when necessity arises for loosening or tightening the nut 2 for maintenance, inspection, and so on, the cap member 5 is removed by breaking as is the case with the bolt 1 in FIG. 1.

In the case of the triple-headed bolt 1 shown in FIG. 4, the screw driving tool is first applied for tightening on the outer head part 2C to shear the small diameter neck portion 3B, followed by removing the collar 4. In the case of further tightening of the bolt, the auxiliary cap member 5' surrounding the middle head part 2B is sheared and removed, and then the tool is applied on this middle head part 2B and the tightening is continued until the large diameter neck portion 3A is sheared. The loosening or tightening of the bolt 1 for maintenance, inspection, and so forth is realized by applying the tool on the inner head part 2A after removal of the cap member 5 in the same way as in the foregoing two embodiments.

Since the screw member according to the present invention has the unique construction described, it has the following effects.

(1) Since the collar 4 cannot be removed until the thin neck portion 3 or the small diameter neck portion 3B is sheared with a predetermined tightening torque by applying the screw driving tool on the outer head part 2C, those screws which are not tightened can be readily discovered by visual verification of the presence or absence of the collar 4.

(2) The collar 4 can readily fit into the thin neck portion 3, 3B by means of the cut-out slot 44 in its front face 43 and the notched portion 41 of the skirt 42, and the cap member 5, engaged with the inner head part 2A is inserted within the periphery of the skirt 42 of the collar 4, which, because the width of the notch 41 is narrower than the diameter of the cap 5, prevents the removal of the collar 4, so that there is no possibility of the collar 4 and the cap member 5 being lost during transportation of the article or its fitting work, and moreover it is easy to handle.

(3) Since the outer periphery of the inner head part 2A is surrounded by the cap member 5, even when attempt is made as by applying an ordinary screw driving tool to the inner head part 2A and turning, the tool idles by slippage between the tool and the cap member 5, between the cap member and the outer periphery of the inner head part 2A, as well as the annular stepped part 11, 21, hence tightening is impossible.

(4) In the case of the triple-headed screw part shown in FIGS. 3 and 4, the cap member 5 is already fitted to surround the outer periphery of the inner head part 2A, when the screw driving tool is applied on the middle head part 2B following removal of the collar 4 by separating the outer head part 2C (in the embodiment of FIG. 4, after breaking and removing the auxiliary cap member 5'), so that there is no possibility of the tool being applied on the inner head part 2A by mistake, hence the middle head part 2B can be accurately tightened to break the large diameter neck portion 3A.

(5) When it becomes necessary to loosen or re-tighten the screw which has once been completely tightened, the cap member 5 is broken and removed to expose the inner head part 2A. Therefore, those screws having no cap member 5 fitted thereon indicate that they were subjected to loosening or tightening work, or the cap member 5 was removed therefrom for some reason or other, which provides a convenient check for re-confirmation of the tightening torque at a later date, and prevents any trouble occuring due to non-tightening or excessive tightening.

(6) As shown in FIGS. 1 and 2, when the screw is constructed in such a manner that a space S is provided between the cap member 5 and the inner head part 2A, a protruded part 51 is provided on the inner periphery of the cap member 5 to give the space a specific configuration, and the inner head part 2A can neither be loosened nor tightened without use of a socket type torque wrench having a specific external configuration conformable to the specific configuration of the space, the loosening and tightening work on the screw member 1, 2 can be done efficiently, without removal of the cap member 5, by appropriate control of the use of the special torque wrench.

(7) In the case of the screw part being a nut, there is no possibility of error in the choosing the lead end of the nut owing to the engaged fitting of the collar 4 and the cap member 5, whereby erroneous handling can be avoided.

Incidentally, the head parts 2A, 2B, 2C, the collar 4, and the cap member 5 are differently colored respectively to facilitate visual distinction among them.

What is claimed is:

1. A fastener arrangement comprising:
a threaded screw member having a plurality of heads disposed in a longitudinal direction of the threaded member, each of said plurality of heads being interconnected with its adjacent head by a neck portion, said neck portion being so thin as to be sheared when a tightening torque is applied thereto which exceeds a predetermined value;
a cap member engaged with said threaded member, said cap member including an upwardly opening annular portion surrounding side surfaces of at least the innermost one of the plurality of heads, and a flange portion that extends inboardly with respect to the longitudinal direction of said threaded member, beneath a portion of the said innermost head;
said annular portion having an inner peripheral surface defining, with the said innermost head side surfaces, the shape of a space between the said side surfaces of the head and said inner peripheral surface, said annular portion including a protuberance extending inwardly from the inner peripheral surface thereof engaging with a surface defining a complementary depression in a driving portion of a driving tool, whereby said space has a lateral cross section which is of such a shape as to prevent said driving portion of said driving tool applicable to said inner head, when received into the space, from rotating with respect thereto.

2. An arrangement in accordance with claim 1, wherein said plurality of heads comprises three or more heads interconnected by corresponding two or more neck portions,
said neck portions being so formed that neck portions nearer the outermost head in the longitudinal direction are thinner than neck portions nearer the innermost one of the heads so as to be sheared when a tightening torque is applied thereto which exceeds a lower predetermined value.

3. An arrangement in accordance with claim 1, wherein the shape of the lateral cross section of the space defined by said annular portion is generally circular but has at least one straight side and the driving portion of the driving tool has a shape complementary thereto.

4. An arrangement in accordance with claim 1, wherein said cap flange has a projection extending inboardly, and said inner head has a notch formed in its lower edge, engaged with the projection when the two are assembled, thereby preventing said cap member from being displaced with respect to the threaded member.

5. An arrangement in accordance with claim 1, wherein said cap member is made of a material which can be ruptured by a cutting tool.

6. An arrangement in accordance with claim 1, wherein said innermost head has an annular step portion at its lower surface, the riser thereof being higher than the thickness of the flange extending beneath the undersurface, whereby a surface against which the head is tightened bears upon a surface of the head inboard of the flange, and not on the flange.

7. An arrangement in accordance wth claim 1, wherein the threaded member comprises a bolt having a shank threaded through at least a part of its length from an end opposite the head end, and an insulating sheath mounted securely on the shank and extending short of the threaded end.

8. An arrangement in accordance with claim 1, wherein said threaded member comprises a nut having a plurality of heads, said nut including a longitudinally extending passage with an internally threaded portion within the innermost head, and a diametrically larger unthreaded portion, the unthreaded portion extending through the other of said heads.

9. An arrangement in accordance with claim 7, further comprising a washer member which is held between the innermost of the plurality of heads and one end of the insulating sheath.

* * * * *